United States Patent
Yeh et al.

(10) Patent No.: US 9,059,487 B2
(45) Date of Patent: Jun. 16, 2015

(54) BATTERY WITH SOAKING PLATE FOR THERMALLY AND ELECTRICALLY CONDUCTIVE CHANNEL

(75) Inventors: Sheng-Fa Yeh, Miaoli County (TW); Chiou-Chu Lai, Hsinchu County (TW); Chin-Chuan Chang, Taipei County (TW); Deng-Tswen Shieh, Hsinchu (TW); Chich-Lun Lo, Hsinchu (TW); Shu-Ping Lin, Pingtung County (TW); Chun-Jui Hung, Kaohsiung (TW); Li-Lun Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 652 days.

(21) Appl. No.: 12/972,550

(22) Filed: Dec. 20, 2010

(65) Prior Publication Data

US 2012/0052351 A1 Mar. 1, 2012

(30) Foreign Application Priority Data

Aug. 24, 2010 (TW) .............................. 99128281 A

(51) Int. Cl.
*H01M 10/0587* (2010.01)
*H01M 10/613* (2014.01)
*H01M 10/04* (2006.01)
(Continued)

(52) U.S. Cl.
CPC ........ *H01M 10/5004* (2013.01); *H01M 10/045* (2013.01); *H01M 10/0431* (2013.01); *H01M 10/052* (2013.01); *H01M 10/0587* (2013.01); *H01M 10/5016* (2013.01); *H01M 10/503* (2013.01); *H01M 10/5042* (2013.01); *Y02E 60/122* (2013.01)

(58) Field of Classification Search
CPC ......................... H01M 10/0431; H01M 10/045
USPC ........................................................... 429/94
See application file for complete search history.

(56) References Cited

U.S. PATENT DOCUMENTS

| 6,146,785 A | 11/2000 | Rigobert et al. |
| 6,335,114 B1 | 1/2002 | Ueshima et al. |

(Continued)

FOREIGN PATENT DOCUMENTS

| CN | 1858931 | 11/2006 |
| CN | 1992388 | 7/2007 |

(Continued)

OTHER PUBLICATIONS

"First Office Action of China counterpart application" issued on Aug. 5, 2013, p. 1-p. 7.

(Continued)

*Primary Examiner* — Patrick Ryan
*Assistant Examiner* — Lucas J O'Donnell
(74) *Attorney, Agent, or Firm* — Jianq Chyun IP Office

(57) ABSTRACT

A battery with a soaking plate for a thermally and electrically conductive channel includes a plurality of battery rolls and two cap assemblies. Each of the battery rolls includes a central member and at least one electrode piece. Each of two ends of the central member has a bending portion. The electrode piece at least includes a positive electrode layer and a negative electrode layer. The electrode piece is winding around the central member. The battery rolls are disposed in parallel, and the bending portions at the two ends are formed as terminal disposed portions. The two cap assemblies are disposed at the terminal disposed portions.

12 Claims, 7 Drawing Sheets

(51) Int. Cl.
*H01M 10/052* (2010.01)
*H01M 10/625* (2014.01)
*H01M 10/643* (2014.01)
*H01M 10/654* (2014.01)

(56) References Cited

U.S. PATENT DOCUMENTS

| | | | |
|---|---|---|---|
| 6,548,204 B1 | 4/2003 | Kim et al. | |
| 2002/0071986 A1* | 6/2002 | Exnar | 429/94 |
| 2004/0028999 A1* | 2/2004 | Richard et al. | 429/149 |
| 2005/0089638 A1 | 4/2005 | Chopra | |
| 2006/0035147 A1 | 2/2006 | Lam et al. | |
| 2006/0099500 A1 | 5/2006 | Jeon | |
| 2006/0099504 A1 | 5/2006 | Kim | |
| 2006/0251962 A1 | 11/2006 | Kim | |
| 2009/0142653 A1 | 6/2009 | Okada et al. | |
| 2009/0162738 A1* | 6/2009 | Jiang et al. | 429/90 |
| 2011/0129706 A1* | 6/2011 | Takahashi et al. | 429/94 |

FOREIGN PATENT DOCUMENTS

| | | |
|---|---|---|
| TW | 555158 | 9/2003 |
| TW | I233227 | 5/2005 |
| TW | M287507 | 2/2006 |
| TW | I320242 | 2/2010 |
| TW | I329377 | 8/2010 |

OTHER PUBLICATIONS

"First Office Action of China co-pending application, application No. 201010501591.2" issued on Jul. 24, 2013, p. 1-p. 8.

"Office Action of Chinese Counterpart Application", issued on Aug. 29, 2014, p. 1-p. 11.

\* cited by examiner

BATTERY WITH SOAKING PLATE FOR THERMALLY AND ELECTRICALLY CONDUCTIVE CHANNEL

CROSS-REFERENCE TO RELATED APPLICATION

This application claims the priority benefit of Taiwan application serial no. 99128281, filed on Aug. 24, 2010. The entirety of the above-mentioned patent application is hereby incorporated by reference herein and made a part of specification.

BACKGROUND OF THE INVENTION

1. Field of the Invention

The disclosure is related to a battery, and in particular to a battery with a soaking plate for a thermally and electrically conductive channel.

2. Description of Related Art

Batteries are installed in various products on the market, from highly demanded portable electronic products to cars and motorcycles used for transportation. A goal constantly pursued by those in the industry is how to reduce battery manufacturing costs and provide consumers with safe and high quality batteries.

Lithium batteries are widely used due to their high power (output) and high energy density. Generally, a lithium battery includes a roll formed by a positive electrode layer, an insulation layer, and a negative electrode layer. The insulation layer prevents the positive electrode layer and the negative electrode layer from directly contacting each other. The roll is housed in a battery container by way of stacking or winding, and after the battery container is filled with an electrolyte solution, the battery container is sealed. After the battery completes a formation step, it may be used as a battery.

When a lithium battery discharges, every spot in the roll releases heat, and since the insulation layer between the positive electrode layer and the negative electrode layer and between multiple stacks or winding of rolls is a heat insulator, it is difficult for heat inside the battery to be dissipated, and heat accumulates in large quantities in the rolls. Moreover, since substrates of the positive electrode layer and the negative electrode layer are electrically conductive materials, heat inside the battery is conducted through the positive electrode layer and the negative electrode layer and accumulates at a roll current convergence point. In general, in order to channel currents out from the battery and make the battery container easy to be sealed, the roll current convergence point is usually disposed in the center of the battery. A great amount of heat hence accumulates at the center of the battery, causing an uneven distribution of temperature in the battery. The result is that internal temperatures of the battery continue to rise, meaning that a chance of thermal runaway increases. Once thermal runaway occurs in the battery, an eventual result may be explosion of the battery.

In the prior art related to heat dissipation of batteries, a heat guiding layer or heat dissipation fins are mainly disposed on an outer battery shell to dissipate heat away from the battery. However, even if heat outside the battery shell is removed, the uneven temperature distribution inside the battery cannot be prevented, nor can heat accumulation at the roll current convergence point be avoided.

SUMMARY OF THE INVENTION

The disclosure provides a battery and a cap assembly thereof, which are capable of enhancing coupling reliability between electrode terminals and convergence members and preventing problems of battery over-heating.

The disclosure provides a battery with a soaking plate behaved a thermally and electrically conductive channel. The battery includes a plurality of battery rolls and two cap assemblies. Each of the battery rolls includes a central member and at least one electrode piece. Each of two ends of the central member includes a bending portion. The electrode piece at least includes a positive electrode layer and a negative electrode layer. The electrode piece winds around the central member, wherein the battery rolls are disposed in parallel, and bending portions at the two ends form terminal disposed portions. The two cap assemblies are respectively disposed on the terminal disposed portions. The central member is used as a thermally and electrically conductive channel. Heat and electricity are both guided towards the central member through a coated metal substrate and further guided towards the terminal portions of the battery.

The disclosure provides a cap assembly of a battery which includes a roll combination member, a terminal combination member, an electrode terminal, a strength reinforcing block, a cap, and a pad assembly. The roll combination member includes at least one opening, so that the terminal disposed portions of the rolls are capable of passing through the opening, wherein the terminal disposed portions are formed by the bending portions at two ends of the central member of each of the rolls. The terminal combination member, the electrode terminal, the strength reinforcing block, the cap, and the pad assembly are sequentially combined on the roll combination member, wherein the electrode terminal includes an electrically conductive portion and a thermally conductive portion which surrounds the electrically conductive portion.

In the cap assembly of the battery of the disclosure, the roll combination member has an opening which allows terminal disposed portions to pass through and combines a plurality of rolls. The terminal disposed portions are, for example, formed by the bending portions at two ends of the central member of each of the rolls. The electrode terminal is connected to the bending portions, and the electrode terminal is formed by the electrically conductive portion and the thermally conductive portion which surrounds the electrically conductive portion. Inside the battery, electricity and heat are conducted through the same path, but by utilizing the electrode terminal, the electrically conductive path and the thermally conductive path are separated. A thermally conductive portion is connected to the heat dissipation device outside the battery, so that heat inside the battery is able to be drawn out rapidly, thereby reducing temperature differences between each battery in a battery pack and lowering a chance of thermal runaway.

In order to make the aforementioned and other objects, features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

The disclosure provides a battery which includes a central member and cap assemblies.

The central member is, for example, disposed in a roll. The central member includes, for example, a main portion, electrode convergence members, and connection members. The main portion of the central member is formed by a highly thermally conductive material, the connection members are formed by a highly thermally conductive and electrically insulative material, and the electrode convergence members are formed by an electrically conductive material. The whole central member is hence capable of conducting heat rapidly, so that heat is evenly distributed inside the battery, thereby preventing heat from accumulating at a roll current convergence point. Through a heat dissipation device outside the battery, heat inside the battery is able to be drawn out rapidly. Additionally, bending portions may be disposed at two ends of the central member. The bending portions are used as terminal connection portions and are also able to act as heat dissipation fins.

Each of the cap assemblies are formed, for example, by a roll combination member, a terminal combination member, an electrode terminal, a strength reinforcing block, a cap, and a pad assembly. The roll combination member has an opening which allows terminal disposed portions to pass through and combines a plurality of rolls. The terminal disposed portions are, for example, formed by the bending portions at two ends of the central member of each of the rolls. The electrode terminal is connected to the bending portions, and the electrode terminal is formed, for example, by an electrically conductive portion and a thermally conductive portion which surrounds the electrically conductive portion. Inside the battery, electricity and heat are conducted through the same path, but by utilizing the electrode terminal, the electrically conductive path and the thermally conductive path are separated. A thermally conductive portion is connected to the heat dissipation device outside the battery, so that heat inside the battery is able to be drawn out rapidly, thereby reducing temperature differences between each battery in a battery pack and lowering a chance of thermal runaway.

Figure 1A:
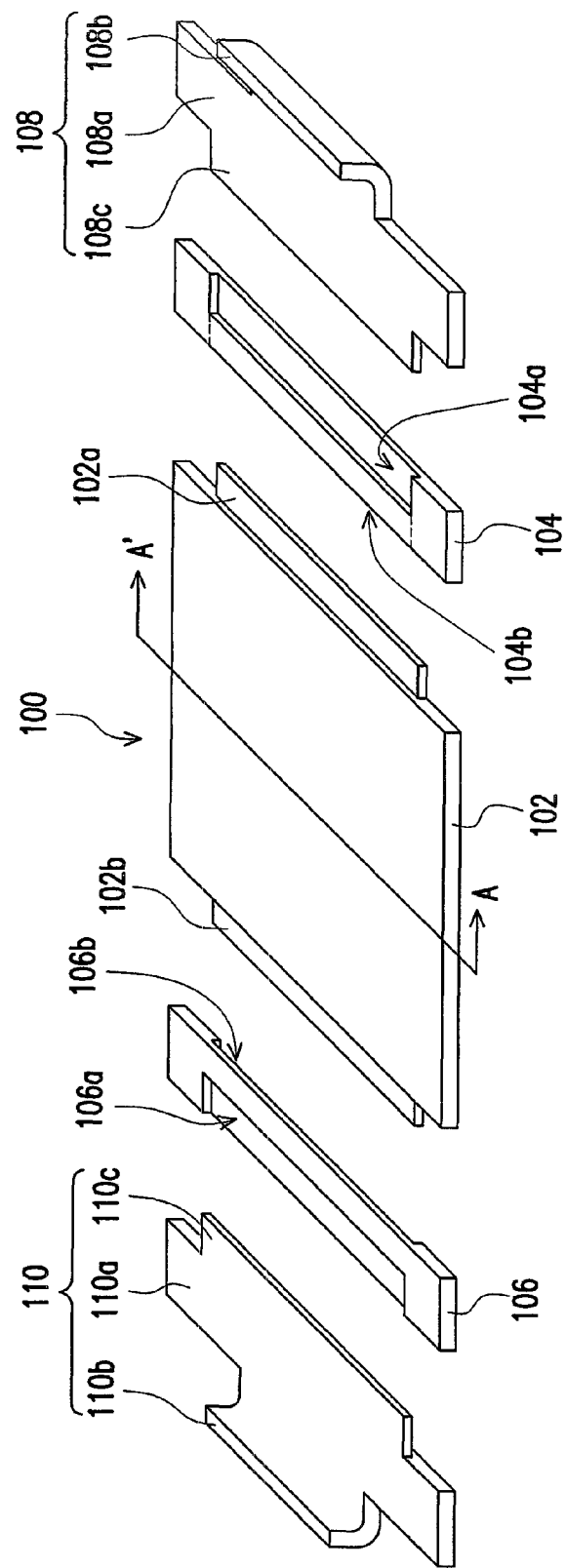
FIG. 1A is a schematic diagram illustrating a central member of a battery roll according to an embodiment of the disclosure.
Figure 1B:
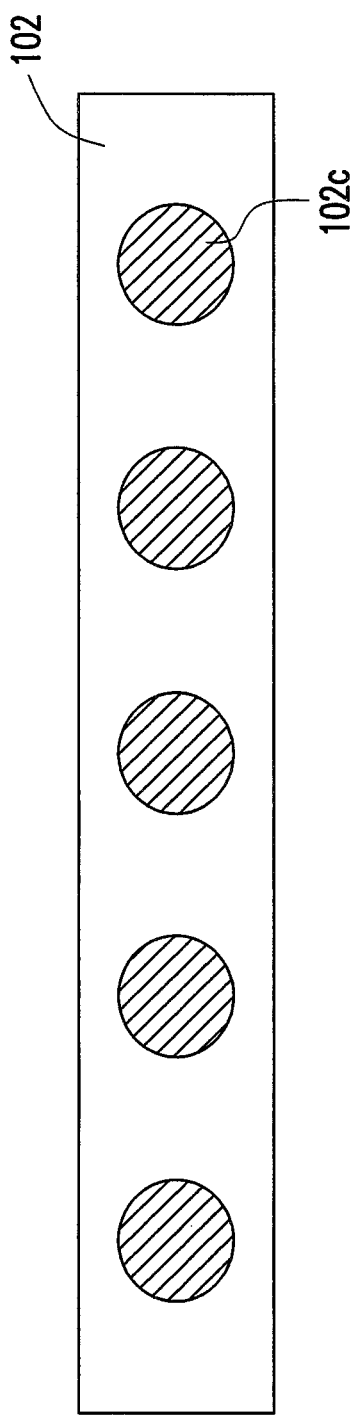
FIG. 1B is a schematic cross-section diagram illustrating a central member according to an embodiment of the disclosure.
Figure 1C:
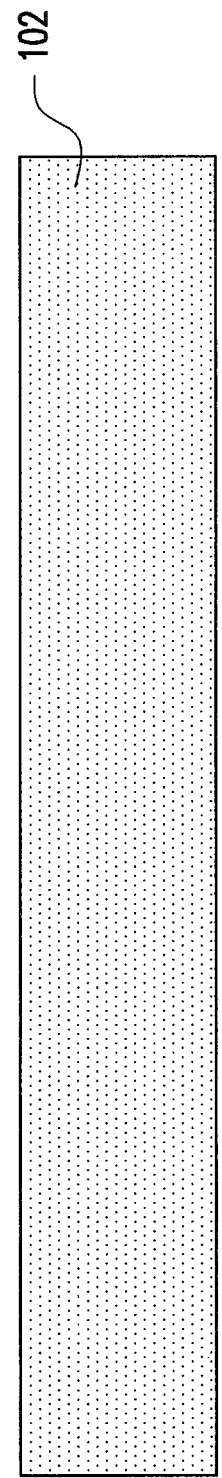
FIG. 1C is a schematic cross-section diagram illustrating a central member according to another embodiment of the disclosure.

FIG. 1A is a schematic diagram illustrating a central member of a battery roll according to an embodiment of the disclosure. FIG. 1B is a schematic cross-section diagram illustrating a central member according to an embodiment of the disclosure. FIG. 1C is a schematic cross-section diagram illustrating a central member according to another embodiment of the disclosure. FIGS. 1B and 1C are schematic cross-section diagrams taken along a line A-A' in FIG. 1A. In FIGS. 1A, 1B, and 1C, a rectangular central member is used as an example.

Referring to FIG. 1A, a central member 100 of a battery roll includes, for example, a main portion 102, connection members 104 and 106, and electrode convergence members 108 and 110.

The main portion 102 is formed by a highly thermally conductive material, wherein a thermal conductivity of the highly thermally conductive material is larger than 10 W/mK. A material of the main portion 102 may also be an electrically conductive material or an electrically insulative material. A material of the main portion is selected from a group consisting of a metal material and a composite material (such as a carbon fiber composite material, a polymeric electrically insulative and thermally conductive composite material). Flanges 102a and 102b are, for example, disposed at two ends of the main portion 102. According to an embodiment of the disclosure, as shown in FIG. 1B, a plurality of openings 102c are disposed in the main body 102 and are filled with a heat-adsorbing material. According to another embodiment of the disclosure, as shown in FIG. 1C, a plurality of pores are disposed in the main body 102, and the main body 102 is filled with a heat-adsorbing material.

The connection members 104 and 106 are formed by a highly thermally conductive and electrically insulative material, so as to separate a positive and a negative electrode to prevent short circuits. A thermal conductivity of the highly thermally conductive and electrically insulative material is larger than 10 W/mK. A material of the connection members 104 and 106 is polyolefin, which is a highly thermally conductive and electrically insulative plastic, and doped with one selected from a group consisting of nanometer-scale carbon particles, metal powder, and carbon powder. The connection members 104 and 106 are, for example, disposed at the two ends of the main portion 102. The connection member 104 connects the electrode convergence member 108 and the main portion 102, and the connection member 106 connects the electrode convergence member 110 and the main portion 102. Connection grooves 104a, 104b, 106a, and 106b are respectively disposed on the connection members 104 and 106.

The electrode convergence members 108 and 110 are formed by an electrically conductive material, and are respectively used as a positive electrode convergence member and a negative electrode convergence member. A material of the electrode convergence members 108 and 110 is selected from a group consisting of copper, aluminum, gold, nickel, and iron. The electrode convergence members 108 and 110 have connection portions 108a and 110a and bending portion 108b and 110b. The bending portions 108b and 110b are disposed perpendicular to the connection portions 108a and 110a. Flanges 108c and 110c are disposed on the connection portions 108a and 110a.

The flanges 108c and 110c of the electrode convergence members 108 and 110 are connected to the connection grooves 104a and 106a via physical methods such as wilding, bonding, riveting, or latching. The flanges 102a and 102b of the main portion 102 are connected to the connection grooves 104b and 106b via physical methods such as wilding, bonding, riveting, or latching.

The main portion 102 of the central member 100 in the disclosure is formed by a highly thermally conductive material, the connection members 104 and 106 are formed by a highly thermally conductive and electrically insulative material, and the electrode convergence members 108 and 110 are formed by an electrically conductive material. Therefore the whole central member 100 is able to conduct heat rapidly, so that heat is evenly distributed inside the battery, thereby preventing heat from accumulating at a roll current convergence point.

Although in the above embodiment, the rectangular central member is used as an example, the central member of the disclosure has a shape that is able to change according to a shape and structure of the battery, so that the central member may also be columnar.

Only one type of connection method is described in the above embodiment. What is important is that the connection member 104, the electrode convergence member 108, the main portion 102, the connection member 106, and the electrode convergence member 110 form a flat central roll piece (central member). This central roll piece (central member) provides support during winding, so that an electrode piece is winding thereon to form a roll. This central roll piece (central member) may be a device which is electrically conductive and thermally conductive.

Figure 1D:
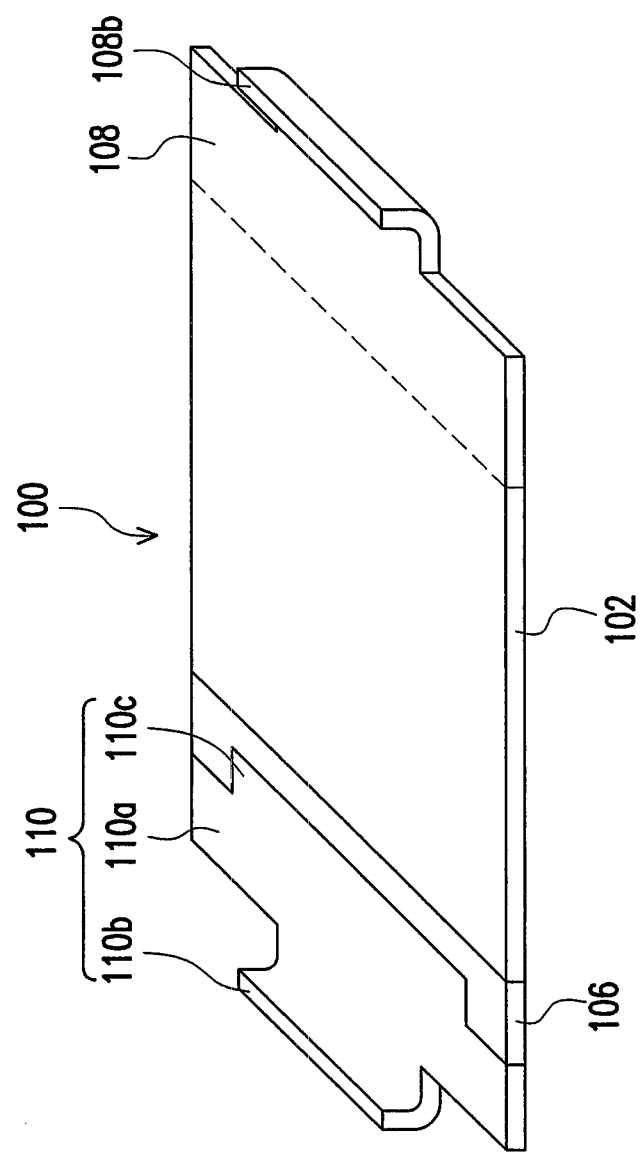
FIG. 1D is a schematic diagram illustrating a central member of a battery roll according to another embodiment of the disclosure.

FIG. 1D is a schematic diagram illustrating a central member of a battery roll according to another embodiment of the disclosure.

Referring to FIG. 1D, the central member of the disclosure may have only one connection member 106, and the electrode convergence member 108 and the main portion 102 are integrally formed by a same electrically conductive material.

Figure 2:
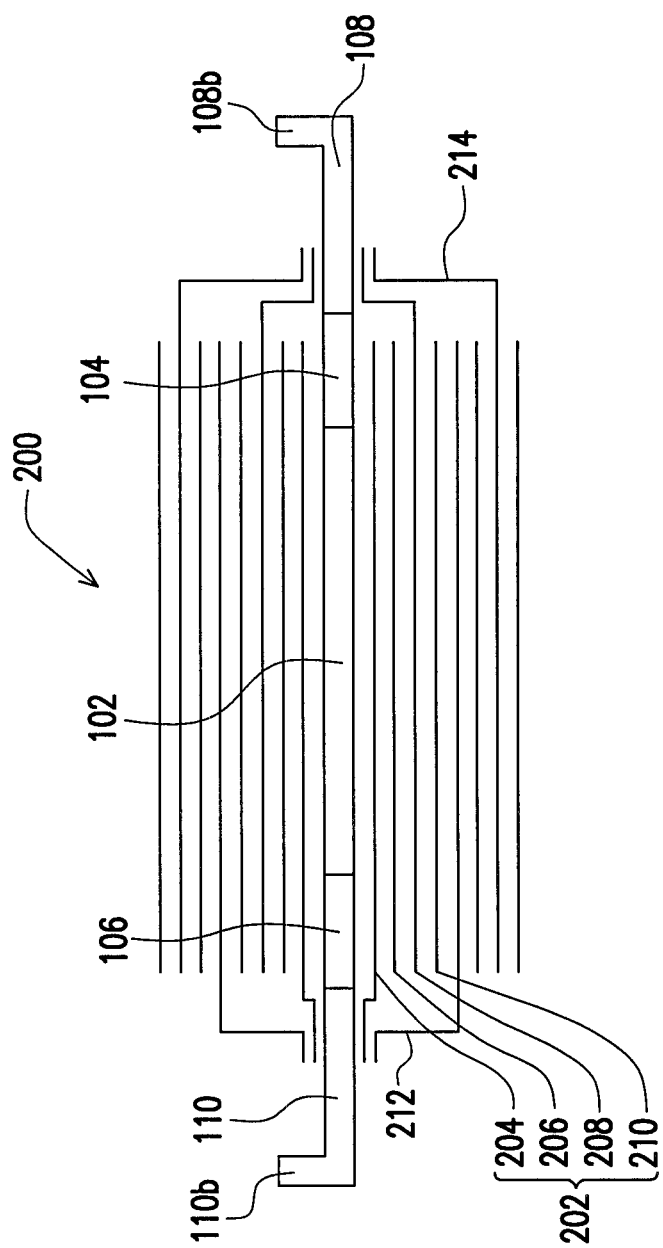
FIG. 2 is a schematic diagram illustrating a battery roll according to an embodiment of the disclosure.

The following describes a battery roll of the disclosure. FIG. 2 is a schematic diagram illustrating a battery roll according to an embodiment of the disclosure. In FIG. 2, the same reference numbers as those in FIG. 1A represent the same elements and are not repeatedly described.

According to FIG. 2, a battery roll 200 includes a central member 100 and at least one electrode piece 202. A structure of the central member 100 is shown in FIG. 1A.

The electrode piece 202 sequentially includes a positive electrode layer 204, insulation layer 206, a negative electrode layer 208, and an insulation layer 210. According to the present embodiment, the electrode piece 202 is, for example, winding around the central member 100.

The positive electrode layer 204 is, for example, a metal foil such as an aluminum foil, a nickel foil, or a steel foil coated by an positive electrode active substance. The positive electrode active substance includes a lithium-transition metal oxide and phosphate. The positive electrode active substance is, for example, lithium cobalt oxide, lithium nickle cobalt manganese oxide, lithium manganese oxide and lithium iron phosphate. The negative electrode layer 208 is, for example, a metal foil such as a copper foil, a nickel foil, or a steel foil coated by a negative electrode active substance. The negative electrode active substance includes carbon, tin, silicon, lithium titanate or another compound. A positive electrode connection portion 212 (blank portion) which is not coated by the positive electrode active substance is disposed on a side of the positive electrode layer 204. The positive electrode connection portion 212 is connected to the convergence member 110. A negative electrode connection portion 214 (blank portion) which is not coated by the negative electrode active layer is disposed on a side of the negative electrode layer 208. The negative electrode connection portion 214 is connected to the convergence member 108. The positive electrode connection portion 212 and the negative electrode connection portion 214 (blank portions) form layers of stacked regions, and the blank portions are directly welded or riveted in a multi-layered manner on metal portions (electrode convergence members) of the central member. Hence, the positive electrode layer 204 (such as an aluminum foil) and the negative electrode layer 208 (such as a copper foil) form heat dissipation fins, which are capable of collecting heat and electricity through the metal portions (electrode convergence members) of the central member and transmitting the heat and electricity to terminal portions. The heat and electricity are then drawn out by using the heat dissipation device outside the battery. The central member is used as a thermally and electrically conductive channel. Heat and electricity are both guided towards the central member through a coated metal substrate and further guided towards the terminal portions of the battery.

A material of the insulation layers 206 and 210 includes an organic polymeric material (for example, a porous film of polyolefins such as polyethylene or polypropylene) or an inorganic material (for example, a porous film such as ceramic non-woven fabric). The insulation layers 206 and 210 may be single-layered structures or multi-layered structures.

In the battery roll 200, the central member 100 is inserted into a rolling machine (not shown) and is covered by an insulation layer (not shown). The top of the rolling machine is rotated for at least one round, so that the insulation layer fully covers the central member 100. The positive electrode layer 204 and the negative electrode layer 208 are sequentially added between the insulation layer, and the central member 100 is rotated, so that the positive electrode layer 204, the insulation layer 206, the negative electrode layer 208, and the insulation layer 210 continue to wind around the central member 100 and form a battery roll 200. In addition, an electrolyte solution (such as a lithium salt solution) is injected between the central member 100, the positive electrode layer 204, and the negative electrode layer 208, so as to conduct electricity.

In the battery roll 200 according to the above embodiment, the electrode convergence members 108 and 110 are disposed at the two ends of the central member 100. A positive electrode connection portion 212 and a negative electrode connection portion 214 of the electrode piece 202 are, for example, respectively welded to the electrode convergence member 110 and the electrode convergence member 108, so as to form the so-called roll current convergence point. Since the whole central member 100 is formed with the highly thermally conductive material, heat is able to be conducted rapidly. Therefore, heat accumulated inside the battery is able to be dissipated through the central member 100. By using the central member 100, heat accumulation in the battery and the current convergence point of the battery is removed, thereby reducing the temperature difference between each battery in a battery pack and lowering the chance of thermal runaway.

Figure 3:
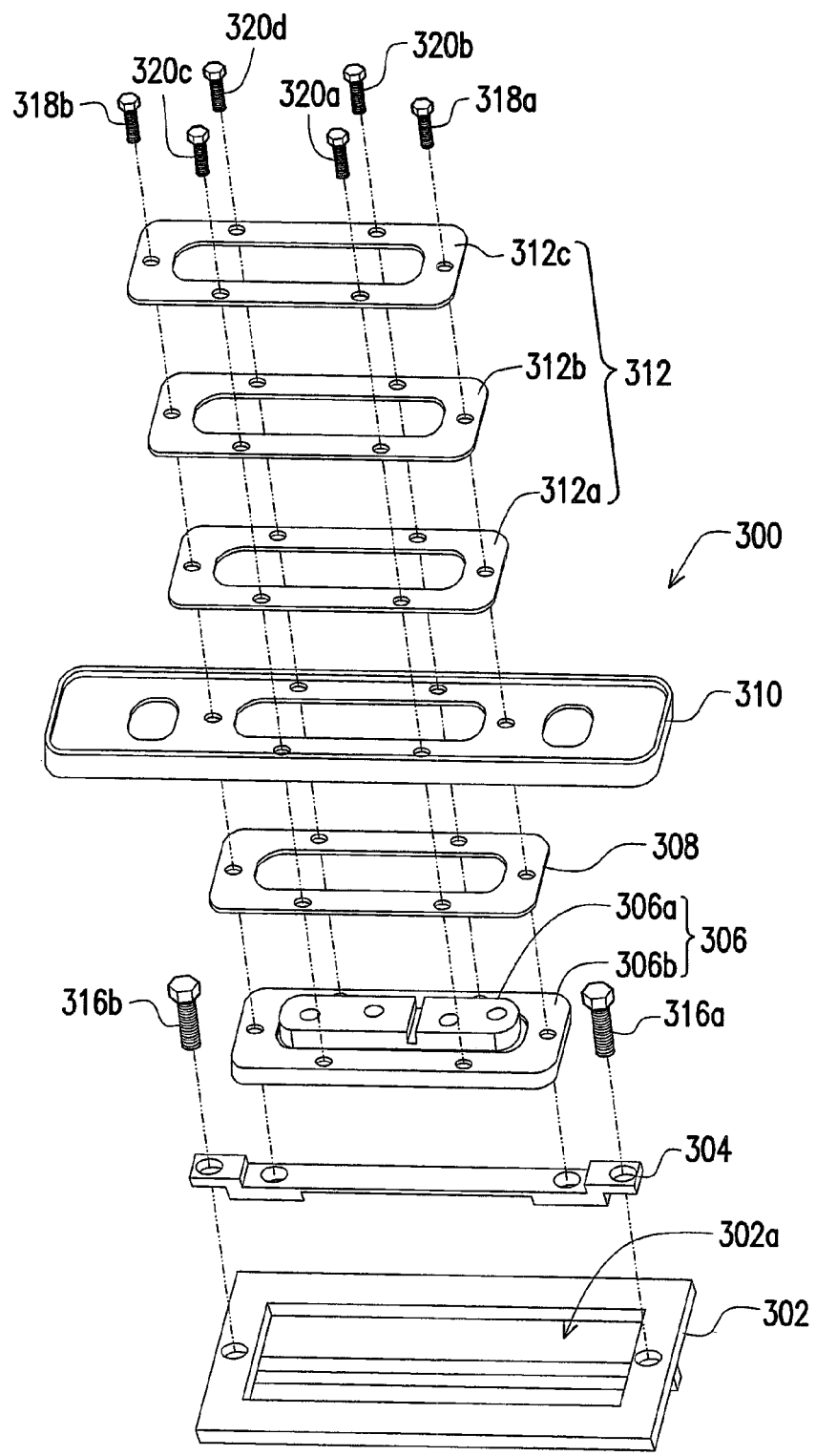
FIG. 3 is a schematic diagram illustrating a cap assembly according to an embodiment of the disclosure.
Figure 4:
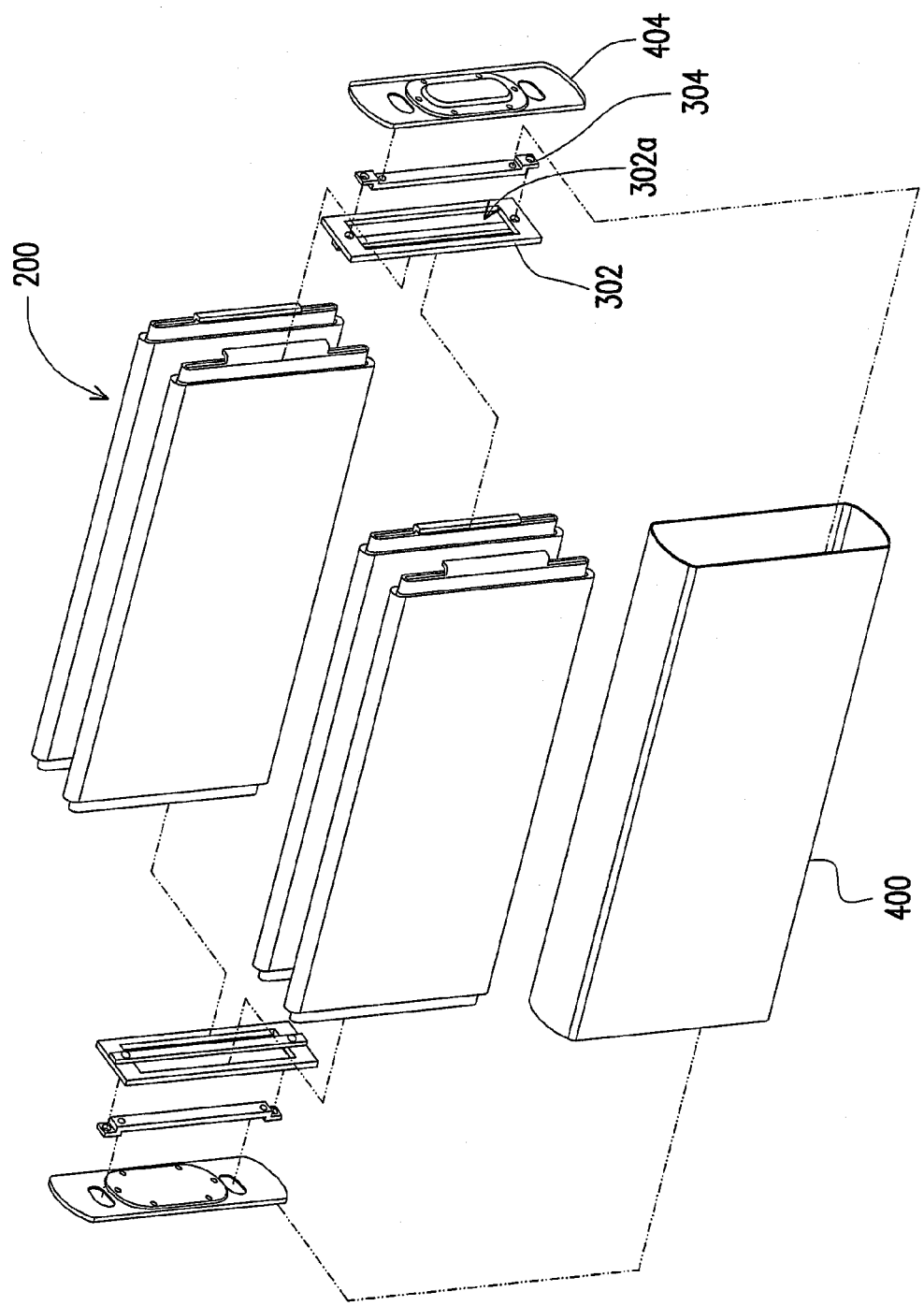
FIG. 4 is a schematic diagram illustrating a battery according to an embodiment of the disclosure.
Figure 5B:
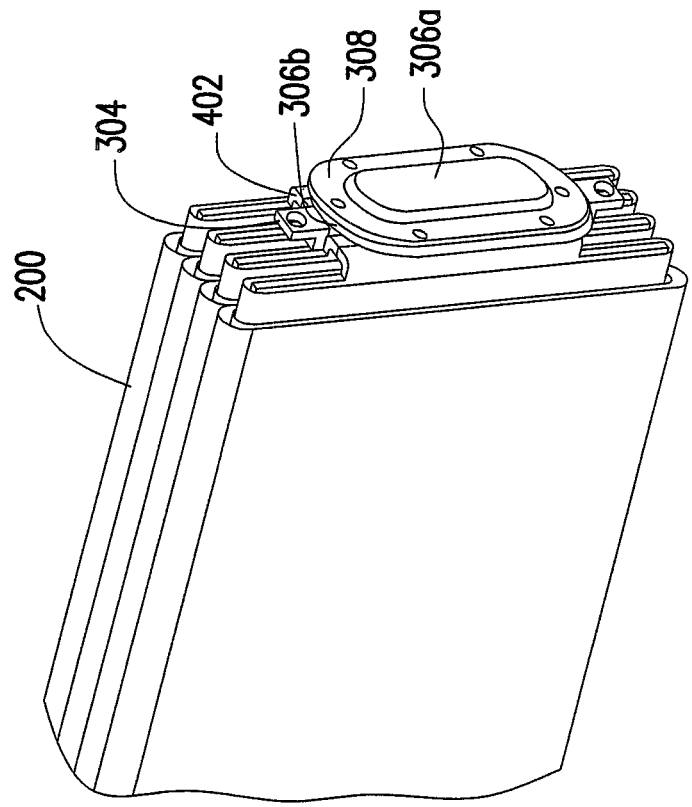
FIGS. 5A and 5B are each a schematic partial diagram illustrating a structure of a battery according to an embodiment of the disclosure.
Figure 5A:
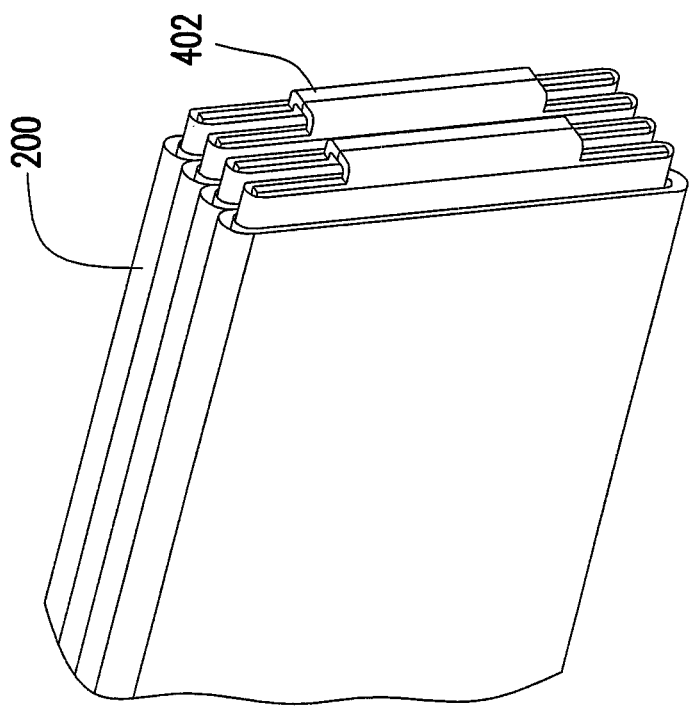

FIG. 3 is a schematic diagram illustrating a cap assembly according to an embodiment of the disclosure. FIG. 4 is a schematic diagram illustrating a battery according to an embodiment of the disclosure. FIGS. 5A and 5B are schematic partial views of a battery according to an embodiment of the disclosure.

According to FIG. 3, the cap assembly of the battery of the disclosure is formed, for example, by a roll combination member 302, a terminal combination member 304, an electrode terminal 306, a strength reinforcing block 308, a cap 310, and a pad assembly 312.

The roll combination member 302 has at least one opening 302a, so that the terminal disposed portions of the roll are able to pass through the opening 302a. The terminal disposed portions are, for example, formed by the bending portions at the two ends of the central member of each of the rolls (as shown in FIG. 2).

The electrode terminal 306 includes an electrically conductive portion 306a and a thermally conductive portion 306b which surrounds the electrically conductive portion 306a. A material of the electrode terminal 306 is, for example, copper or aluminum. A material of the strength reinforcing block 308 is, for example, stainless steel.

The pad assembly 312 is selected from a group consisting of electrically insulative pads 312a and 312c and an air-tight pad 312b. A material of the pad assembly 312 includes multiple layers of different polymeric materials.

The terminal combination member 304, the electrode terminal 306, the strength reinforcing block 308, the cap 310, and the pad assembly 312 are sequentially combined on the roll combination member 302. The terminal combination member 304 is, for example, fixed on the roll combination member 302 through screws 316a and 316b. The pad assembly 312, the cap 310, the strength reinforcing block 308, and the electrode terminal 306 are, for example, fixed on the terminal combination member 304 through screws 318a and 318b. The pad assembly 312, the cap 310, and the strength reinforcing block 308 are, for example, fixed on the electrode terminal 306 through screws 320a, 320b, 320c, and 320d.

As shown in FIG. 4, the battery of the disclosure includes a plurality of battery rolls 200, two cap assemblies 300, and an outer shell 400. In the present embodiment, four battery rolls 200 are exemplarily combined. According to actual needs or designs, other numbers of battery rolls 200 may be combined.

The four battery rolls 200 are disposed in parallel, and two of the battery rolls 200 constitute a set. The bending portions at the two ends are arranged opposite to each other. The bending portions form a planar region which is used as the terminal disposed portion 402. In FIG. 5A, an area of the terminal disposed portion 402 (bending portion) is far larger than a cross-sectional area of the central member, so that heat is effectively conducted in the central member and a terminal connection interface.

The two roll combination members 302 are used to combine the battery rolls 200 at the two ends, and the bending portions (terminal disposed portions 402) of the battery rolls 200 pass through the opening 302a on the roll combination members.

Screws are then used to fix the terminal combination members 304 on the roll combination members 302. After the outer shell 400 covers the battery rolls 200, a physical bonding method such as using screws or rivets or welding is used to combine a terminal assembly 404 which includes the electrode terminal, the strength reinforcing block, the cap, and the pad assembly to the roll combination members 304. In FIG. 5B, an area of the electrode terminals includes an area of the terminal disposed regions 402 (bending portions of the central member), so that electrical paths are evenly distributed within each of the rolls.

In the battery according to the above embodiment, the area of the electrode terminals includes the area of the terminal disposed portions (bending portions of the central member), so that the electrical paths are evenly distributed within each of the rolls. Moreover, the area of the terminal disposed portions 402 (bending portion) is far larger than the cross-sectional area of the central member, so that heat is effectively conducted in the central member and the terminal connection interface, thereby reducing the temperature difference between each of the batteries in the battery pack and lowering the chance of thermal runaway.

According to the embodiment, although rectangular batteries and columnar batteries are exemplarily used, batteries of all sorts of shape may be used in accordance with the disclosure. Therefore, the shape of the central member may be changed according to the shape and structure of the batteries. Additionally, the shape of the cap assembly may be changed according to the shape and structure of the batteries.

In summary, the central member of the disclosure is formed by a highly thermally conductive material, so that heat is conducted rapidly and uniformly. Therefore, by using the substrate (copper foil, aluminum foil) coated with the active substance as electrically conductive and heat-collecting fins, heat accumulated in the battery is able to be conducted to the terminal portions along with electricity, and heat extraction or heat dissipation and electricity conduction processes may be performed individually or simultaneously (through the thermally and electrically conductive channel), thereby reducing the temperature difference between each of the batteries in the battery pack and lowering the chance of thermal runaway.

Moreover, since most of the heat generated inside the battery accumulates at the current convergence point (positive electrode convergence member and negative electrode convergence member) of each of the rolls, by designing the current convergence point of each of the rolls to include the bending portions, which have an area far larger than the cross-sectional area of the central member, heat is effectively conducted in the central member and the terminal connection interface. The area of the electrode terminals includes the area of the terminal disposed portions (the bending portions of the central member), thereby reducing the temperature difference between each of the batteries in the battery pack and lowering the chance of thermal runaway.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A battery with a soaking plate for a thermally and electrically conductive channel, comprising:
   a plurality of battery rolls, each of the battery rolls comprising:
      a central member, each of two ends of the central member comprising a bending portion, the central member further comprising:
      a main portion, comprising a highly thermally conductive material;
      a first electrode convergence member and a second electrode convergence member, disposed at a first end and a second end of the main portion, the first end being opposite to the second end;
      a first connection member, formed by a highly thermally conductive and electrically insulative material having a thermal conductivity larger than 10 W/mK, the first connection member being disposed between the main portion and the first electrode convergence member, so as to connect the main portion and the first electrode convergence member, wherein the bending portion is disposed on the first electrode convergence member and the second electrode convergence member; and
      a second connection member, formed by a highly thermally conductive and electrically insulative material having a thermal conductivity larger than 10 W/mK, the second connection member being disposed between the main portion and the second electrode convergence member, so as to connect the main portion and the second electrode convergence member; and at least one electrode piece, at least comprising a positive electrode layer and a negative electrode layer, the electrode piece winding around or being stacked outside the central member, wherein the battery rolls are disposed in parallel, and the bending portions at a first side of the battery rolls form a first terminal disposed portion, while the bending portions at a second side of the battery rolls form a second terminal disposed portion a first cap assembly disposed on the first terminal disposed portion and electrically connecting the bending portions at the first side; and a second cap assembly disposed on the second terminal disposed portion and electrically connecting the bending portions at the second sides, wherein the central member is used as the thermally and electrically conductive channel, and heat and electricity are both guided towards the central member through a coated metal substrate and further guided towards a terminal portion of the battery.

2. The battery with the soaking plate for the thermally and electrically conductive channel as claimed in claim 1, wherein each of the two cap assemblies comprises:

a roll combination member, disposed at a end of the battery rolls, so as to combine the battery rolls, the roll combination member comprises at least one opening thereon, and the bending portions are capable of passing through the opening; and a terminal combination member, an electrode terminal, a strength reinforcing block, a cap, and a pad assembly, sequentially combined on the roll combination member.

3. The battery with the soaking plate for the thermally and electrically conductive channel as claimed in claim 2, wherein the terminal combination member is fixed on the roll combination member by way of using screws, riveting, or welding.

4. The battery with the soaking plate for the thermally and electrically conductive channel as claimed in claim 2, wherein the pad assembly, the cap, the strength reinforcing block, and the electrode terminal are fixed on the terminal combination member by way of using screws, riveting, or welding.

5. The battery with the soaking plate for the thermally and electrically conductive channel as claimed in claim 2, wherein the pad assembly, the cap, and the strength reinforcing block are fixed on the electrode terminal by way of using screws, riveting, or welding.

6. The battery with the soaking plate for the thermally and electrically conductive channel as claimed in claim 2, wherein the pad assembly is selected from a group consisting of an electrically insulative pad and an air-tight pad, and a material of the pad assembly comprises multiple layers of different polymeric material.

7. The battery with the soaking plate for the thermally and electrically conductive channel as claimed in claim 2, wherein the electrode terminal comprises:

an electrically conductive portion; and a thermally conductive portion, surrounding the electrically conductive portion.

8. The battery with the soaking plate for the thermally and electrically conductive channel as claimed in claim 1, wherein the second electrode convergence member and the main portion are formed by a same electrically conductive material, and the second electrode convergence member and the main portion are an integrally formed unit.

9. The battery with the soaking plate for the thermally and electrically conductive channel as claimed in claim 8, wherein a connection groove is disposed on the first connection member, and a flange is disposed on the first end of the main portion; the flange being fixed on the connection groove by way of using screws, riveting, welding, or latching.

10. The battery with the soaking plate for the thermally and electrically conductive channel in claim 1, wherein a connection groove is disposed on each of the first connection member and the second connection member, and a flange is disposed on each of the first end and the second end of the main portion; the flanges being fixed on the connection grooves by way of using screws, riveting, welding, or latching.

11. The battery with the soaking plate for the thermally and electrically conductive channel as claimed in claim 1, wherein a connection groove is disposed on each of the first connection member and the second connection member, and a flange is disposed on each of the first electrode convergence member and the second electrode convergence member; the flanges being fixed on the connection grooves by way of using screws, riveting, welding, or latching.

12. The battery with the soaking plate for the thermally and electrically conductive channel as claimed in claim 1, wherein the positive electrode layer comprises a plurality of positive electrode connection portions which are connected to the first electrode convergence member; and the negative electrode layer comprises a plurality of negative electrode connection portion which are connected to the second electrode convergence member.

* * * * *